United States Patent [19]

Stevie

[11] Patent Number: 5,271,568
[45] Date of Patent: Dec. 21, 1993

[54] SPREADER DEVICE

[76] Inventor: Charles R. Stevie, 509 S. Columbia Ave., Campbellsville, Ky. 42718

[21] Appl. No.: 622,119

[22] Filed: Dec. 6, 1990

Related U.S. Application Data

[63] Continuation of Ser. No. 290,379, Dec. 29, 1988, abandoned.

[51] Int. Cl.$^5$ .............................................. A01C 17/00
[52] U.S. Cl. ................................. 239/686; 222/317; 222/473; 239/668; 251/297
[58] Field of Search ............... 239/650, 686, 668, 669, 239/681, 684, 525, 526; 222/310, 317, 473, 505; 251/297, 319

[56] References Cited

U.S. PATENT DOCUMENTS

| | | | |
|---|---|---|---|
| 2,337,952 | 12/1943 | Whiten | 239/650 |
| 2,514,962 | 7/1950 | McElhatton | 239/686 |
| 3,096,984 | 7/1963 | Garrison | 239/686 |
| 3,157,402 | 11/1964 | Love, Jr. | 239/686 |
| 3,227,461 | 1/1966 | Love, Jr. | 239/686 |
| 3,979,071 | 9/1976 | Biggs, Jr. | 239/686 |
| 4,492,341 | 1/1985 | Allen | 239/686 |

FOREIGN PATENT DOCUMENTS

| | | | |
|---|---|---|---|
| 337164 | 11/1919 | Fed. Rep. of Germany | 239/686 |
| 958297 | 11/1947 | France | 239/686 |

Primary Examiner—Andres Kashnikow
Assistant Examiner—Christopher G. Trainor
Attorney, Agent, or Firm—Edward M. Steutermann

[57] ABSTRACT

A hand held granular material spreading device including a housing with holding storage chamber for a flowable dry material where the chamber is located over a horizontally rotating impeller where there is an opening from the chamber to the impeller whereby rotation of the impeller spreads the material over an area forward of the location of the device. A valve member,,is provided in the opening from the storage chamber to the impeller and an opening is defined by the valve member and is determined by a linkage arrangement which is operated by a lever device which is rotated to adjust the position of the valve member in the opening. Stops can be provided for positioning the lever member to allow the retention of the position of the valve member without continuous pressure on the lever member.

3 Claims, 4 Drawing Sheets

SPREADER DEVICE

This application is a continuation of co-pending application Ser. No. 290,379, filed Dec. 29, 1988, now abandoned.

BACKGROUND OF THE INVENTION

The present invention relates generally to a portable manually held spreading device for spreading dry particulate material and in particular dry granular material such as seed or fertilizer over an area forward of the device.

Devices within the scope of the present invention are lightweight and can be easily transported and can be sized to hold varing amounts of dry granular material. Prior art devices are known which accomplish generally the same purpose as shown in U.S. Pat. No. 3,157,402; U.S. Pat. No. 3,227,461; and U.S. Pat. No. 4,492,341. However, such prior art device do not provide the beneficial arrangement provided by the present invention for selectively positioning a valve member within an opening between the storage chamber and the impeller to allow the maintenance of the valve opening, once set, without continual readjusting or maintaining a pressure or force on the valve setting means.

In general no prior art arrangement is known which accomplishes the objectives of the present invention.

SUMMARY OF THE INVENTION

The present invention relates in general to granular or particulate matter spreading devices and more particularly relates to a portable device utilizing an impeller which rotates in generally horizontal plane on a generally vertical axis where a storage chamber is provided above the impeller and an opening is provided to supply materials to be spread to the impeller with an adjustable valve arrangement provided within the opening.

Even more particularly, the present invention provides an arrangement where the valve member is selectively positionable within the opening and where the positioning arrangement provides a unique and nova]arrangement for positioning the valve member within the opening and retaining the position.

Devices within the scope of the present invention are particularly advantageous over prior art arrangements, because the prior art arrangements have generally required the user to maintain continuous pressure on the device which set the position of the valve member and thus over a period time cause considerable strain on the hand and arm muscles or where the position can be retained without pressure have required that the valve position be set, then a separate lock be manipulated to hold the position.

Further, in prior art devices, once the storage chamber has been depleted so that it must be refilled the user releases the valve member and it is difficult to reset the valve member to precisely the same location so that uniform spreading of the granular material is not accomplished with subsequent refilling of the chamber.

The present invention overcomes many of these disadvantages in that the valve member is easily reset to the same position for spreading of subsequent allotments of granular material and it is not necessary to maintain pressure on the valve setting member in order to maintain uniform flow.

More, particularly, the present invention provides a hand held granular material spreading device including a housing with holding storage chamber for a flowable dry material where the chamber is located over a horizontally rotating impeller where there is an opening from the chamber to the impeller whereby rotation of the impeller spreads the material over an area forward of the location of the device. A valve member is provided in the opening from the storage chamber to the impeller and an opening is defined by the valve member and is determined by a linkage arrangement which is operated by a lever device which is rotated to adjust the position of the valve member in the opening. Stops can be provided for positioning the lever member to allow the retention of the position of the valve member without continuous pressure on the lever member.

One example within the scope of the present invention is illustrated and is described hereinafter, but it will be understood that the illustration and description provided hereinafter are by way of illustration only and the other arrangements also within the scope of the present invention will occur to those skilled in the art upon reading the disclosure setforth hereinafter.

BRIEF DESCRIPTION OF THE DRAWINGS

Referring now to the drawings which illustrate and arrangement within the scope of the present invention.

DETAILED DESCRIPTION OF THE DRAWINGS

Figure 1:
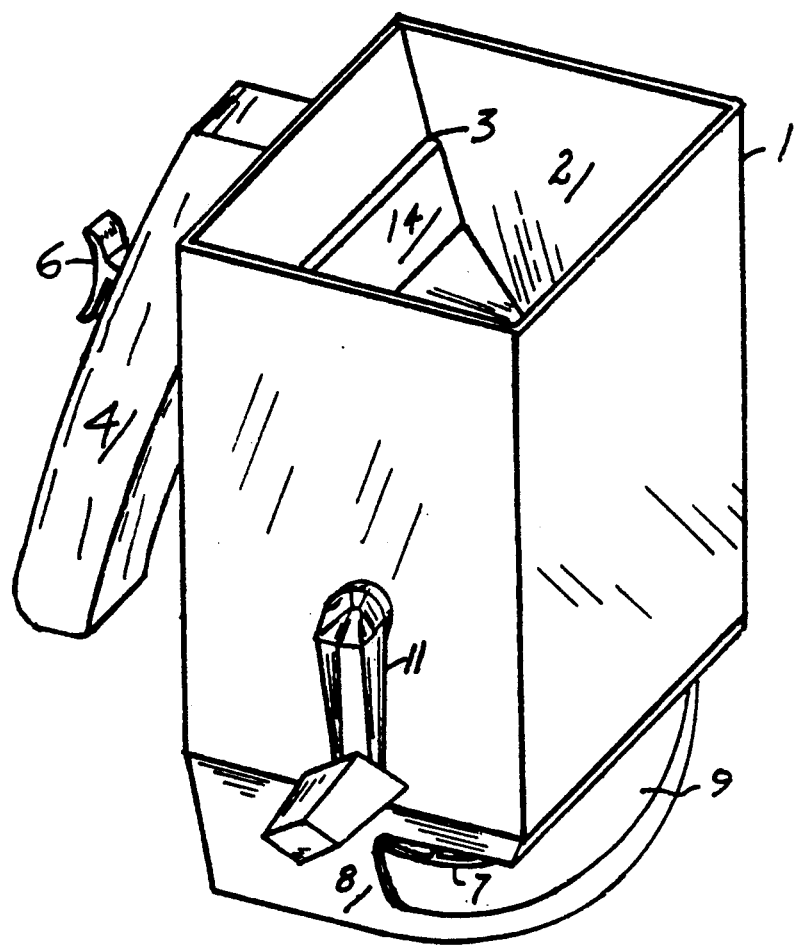
FIG. 1 is a perspective view of a device within the scope of the present invention.

Reffering now to the Figures which illustrate an arrangement within the scope of the present invention and referring particularly to FIG. 1, a housing 1 is provided defining a storage chamber 2 which has an open end to receive dry flowable material and to be spread by the device within the scope of the present invention.

An inner walls 3 and 14 are provided to house the gearing and valve adjustment means as described hereinafter. As also shown in FIG. 1, a handle 4 is provided and adapted to receive an adjustment lever 6, described hereinafter, which adjusts the opening and thus the flow rate of material from the storage chamber 2 to an impeller 7 which is received on bottom side of the housing 1 in a spreader section 8 which has an open end 9 to allow forward distribution of the granular material fed to the impeller. A crank handle assembly 11 is provide and adapted to be rotated to turn the impeller 7 as described hereinafter.

Figure 2:
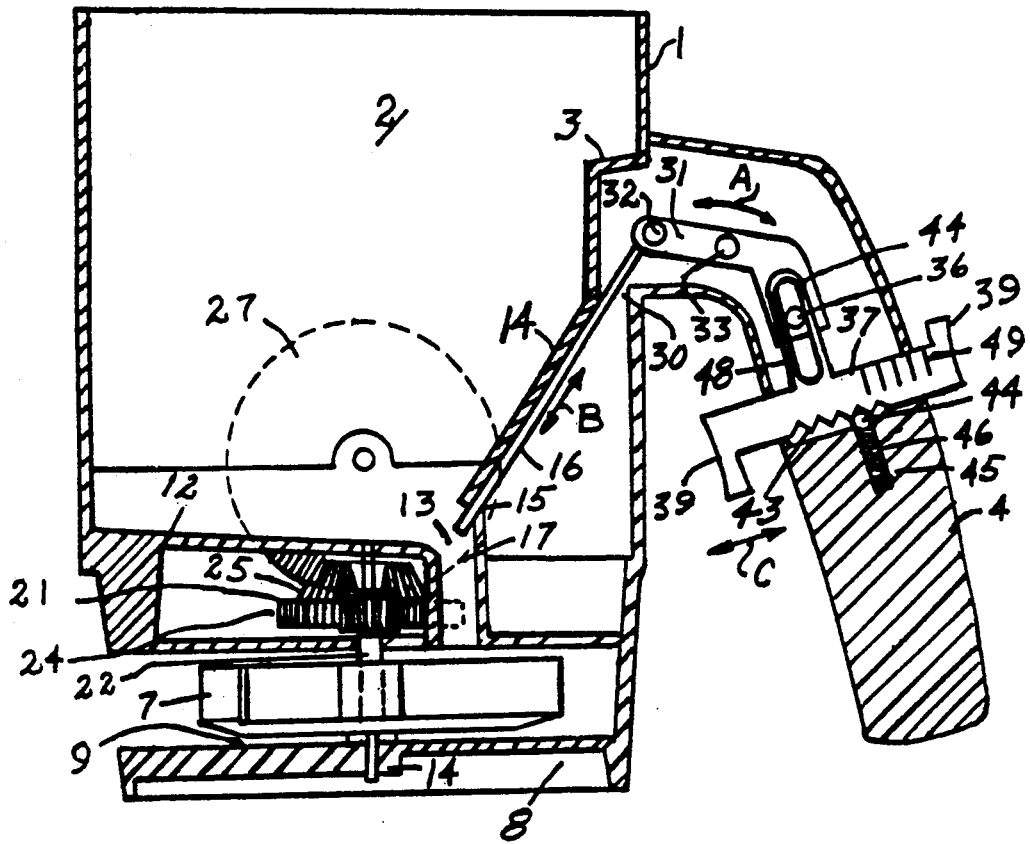
FIG. 2 is a cross-sectional elevational view from the front side of the device shown in FIG. 1.

Referring now to FIG. 2 which is a cross-sectional illustration of an elevational view of the device shown in FIG. 1 then storage chamber 2 is shown with a lower wall 12 provided in the bottom of the device and the slopping inner walls 3 and 14 are likewise illustrated. As shown, the opening 13 is provided in a slopping wall 14 and a slide member or valve member 16 is provided to slide between wall 14 and guide surface 15 and has an end which slides over the opening 13 so that the flow rate through the opening 13 is adjusted by means of the position of the slide 16.

Chute 17 is provided communicating with the opening 13 which is located at the bottom of chamber 2 and allows the material to flow through the chute 17 to the impeller 7 as also shown in FIG. 1 for eject ion of the material through the opening 9.

The impeller 7 is journaled in a bearing 14 in the bottom side of the dispenser element 8 and driven by a gear member 21 attached to a shaft 22 which extends through the impeller member 7. The shaft is received in the gear 21 to rotate the impeller 7 as the gear rotates.

Figure 3:
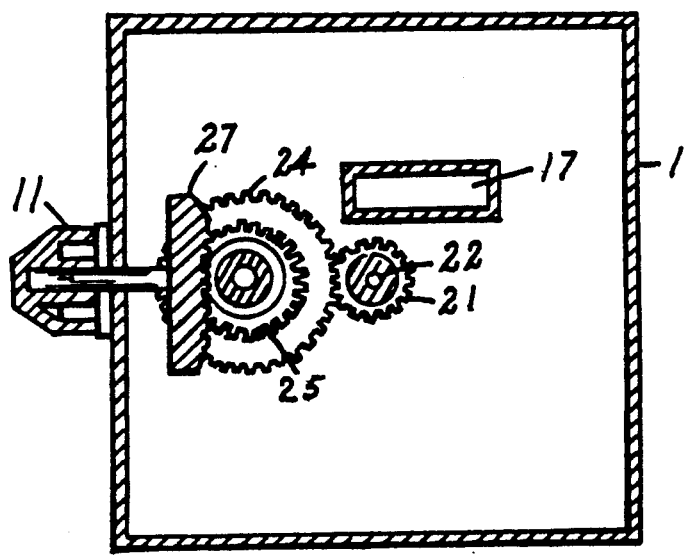
FIG. 3 is a view taken along a plane passing through line 3—3 of FIG. 2.

As shown in FIGS. 2 and 3 gear 21 meshes with a second gear 24 having a superposed bevel gear 26 which then meshes with a drive gear 27 which is rotated by a shaft 29 which is carried by the handle assembly 11. Thus rotation of handle 11 rotates gear 27 which inturn rotates gear 24 where gear 24 is carried by a shaft 25 and turns gear 26 which rotates gear 21 and shaft 23 which turns the impeller 7.

Figure 4:
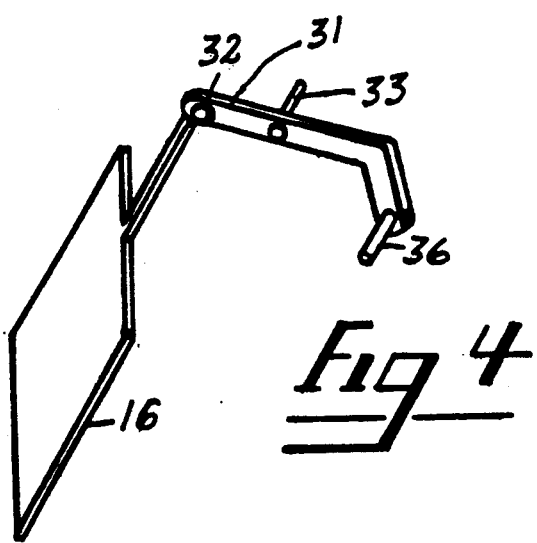
FIG. 4 is a full body perspective view of one example of an element within the scope of the present invention.

As shown in FIGS. 2 and 4 adjustment of the position of the slide 16 is accomplished by means of a "L" shaped lever 31 which is pivotably connected to the slide 16 by means of pivot 32. A central pivot 33 is provided to allow pivotal movement of the arm 31. Arm 31 is also connected, by means of a pin 36 to a slot element 48 of a slide 37 which can be moved relative to the handle 4 as shown by the arrow C. The slide element 37 can be provided with thumbrests 39 at each end for movement of the central portion of the slide, to move the pin 36, which extends through the slot element 44. It will be understood that movement of the slide 37 then adjusts the position of the lever 31 about pivot 33 to position the slide 16 in opening 18.

In order to retain the adjustment of the device serrations 43 are provided in the bottom of slide 37. A ball 44 is provided within a recess 46 in the handle 4 and is urged upperwardly into the serration 43 of the slide 37 by means of a spring 45 so that when the slide 37 is moved to a new position the ball member 44 is received in one of the serration to hold the slide 37 and thus the valve 16 in position until a force is exerted on the handle member which overcomes the force exerted by the spring member and allows movement of the elements.

A free body illustration of the lever mechanism is illustrated in FIG. 4 showing the slide or valve member 16 connected to the lever member 37, by pin 32 with the pins 33 and 36 also shown.

As shown in FIG. 2 adjustment marks 49 are provided along the slide element 37 to permit the setting of the device to the same position in sequential operation.

Figure 5:
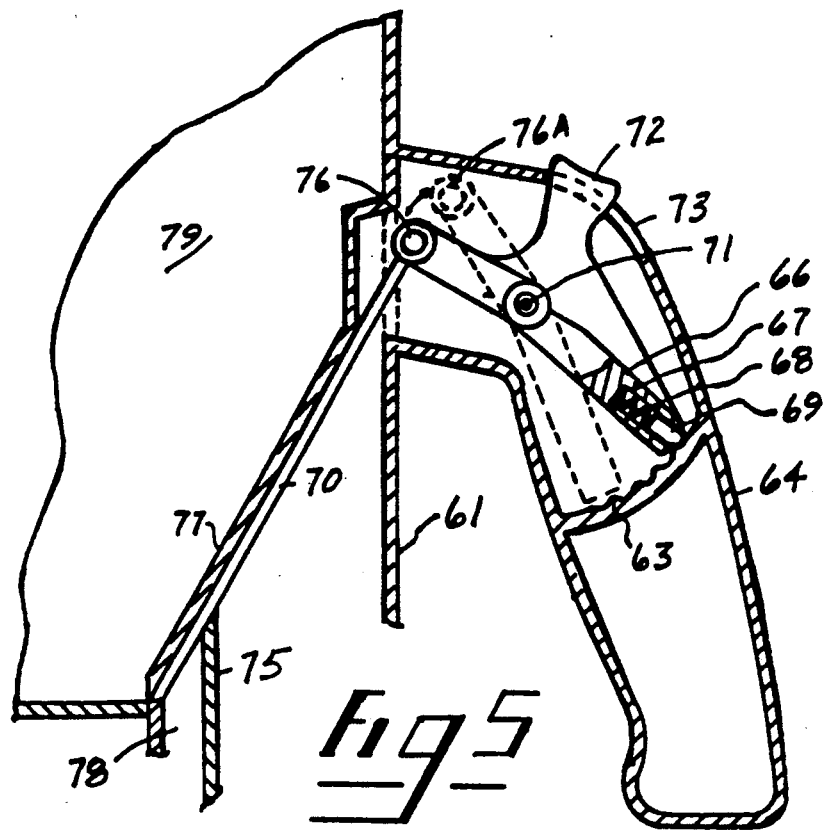
FIG. 5 is a cross sectional view of another arrangement within the scope of the present invention.
Figure 6:
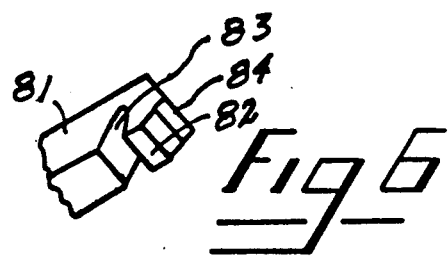
FIG. 6 is another view of a selector element within the scope of the present invention.

FIG. 5 is an illustration of another arrangement within the scope of the present wherein an handle 64 is provided having ridged element 63 adapted to receive a bullet 69 located in a socket 68 within an extension 67 of a lever 66. As shown lever 66 is pivoted around a pivot 71 having a lateral extension 72 which serves as a selector. A pivot 76 is provided at the opposite end of lever 66 to receive the slide element which closes the conduit 78 defined by the outer wall 75 of the container (balance which is not shown). The handle 72 is moved from the position shown to a second position in a slot 73 to move the pivot 76 to the position shown by numerial 76A to open the conduit for release of material located within the chamber 79. The foregoing is illustrative of the fact that various arrangements can be provided within the scope of the present invention and FIG. 6 is an example of another arrangement which can be used on the tip of the arm 66 where an arm extension 81 is provided and is made of a simi-rigid material so that end element 82 can be deformed because of the notch 83 where the tip end 84 rides fluted section 63 is the same as the bullet 69. The difference being that no spring or moveable element is required.

It will be understood that the foregoing is but example of an arrangement within the scope of the present invention and that various other arrangements also within the scope of the present invention will occur to those skilled in the art upon reading the disclosure setforth hereinbefore.

I claim:

1. A hand held granular material spreading device including a housing defining a storage chamber for a flowable dry material where said storage chamber has an outlet; horizontally rotating impeller means located beneath said outlet form said chamber whereby rotation of the impeller means spreads said dry material over an area forward of the device; valve means including a valve member to selectively cover and uncover said outlet to limit flow of said dry material to the impeller; linkage means connected to said valve member to position the valve member in said outlet; pivotable lever means having a first leg and a generally transversely extending second leg; pivot means connected to said lever means adjacent the area where said second leg extends from said first leg so said lever means pivots about said pivot means and where said first leg is connected to said linkage means and said second leg carries pin means; second lever means having slot means to receive said pin means where said pin means moves in said slot means and said second lever has transversly extending arm means having a serrated surface opposite said slot means where movement of said second lever means in a direction parallel to the longitudinal axis of said arm means moves said pin means in said slot means to pivot said lever means about said pivot means and move said linkage means and valve member to selectively adjust the position of the valve member in the outlet; and biased cam means to be received in said serrated surface to allow the retention of the position of said second lever means without continuous pressure on the second lever means.

2. The invention of claim 1 wherein said cam means includes a first base member having a tubular receptacle therein and outwardly biased ball means received in said receptacle and extending outwardly therefrom to be received in the serrations of said serrated surface.

3. The invention of claim 2 wherein said ball means includes a pointed end member with spring means to bias said pointed end member outwardly with respect to said receptacle so said pointed end member extends outwardly from said receptacle and said serrated surface is located to receive the end of said pointed end member as said lever is moved to adjust the position of said valve member in said outlet.

* * * * *